(12) United States Patent
Dutti et al.

(10) Patent No.: US 10,680,888 B2
(45) Date of Patent: Jun. 9, 2020

(54) STATE SYNCHRONIZATION BETWEEN A CONTROLLER AND A SWITCH IN A COMMUNICATIONS NETWORK

(71) Applicant: Telefonaktiebolaget LM Ericsson (publ), Stockholm (SE)

(72) Inventors: Enrico Dutti, Pisa (IT); Giulio Bottari, Pisa (IT); Daniele Ceccarelli, Stockholm (SE); Francesco Fondelli, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 113 days.

(21) Appl. No.: 15/771,974

(22) PCT Filed: Nov. 9, 2015

(86) PCT No.: PCT/EP2015/076109
§ 371 (c)(1),
(2) Date: Apr. 27, 2018

(87) PCT Pub. No.: WO2017/080582
PCT Pub. Date: May 18, 2017

(65) Prior Publication Data
US 2018/0351802 A1    Dec. 6, 2018

(51) Int. Cl.
*H04L 12/24* (2006.01)
*H04L 1/16* (2006.01)
*H04L 12/721* (2013.01)

(52) U.S. Cl.
CPC ........ *H04L 41/0816* (2013.01); *H04L 1/1671* (2013.01); *H04L 41/0813* (2013.01); *H04L 41/0866* (2013.01); *H04L 45/38* (2013.01)

(58) Field of Classification Search
CPC ............. H04L 41/0654; H04L 41/0803; H04L 41/0866; H04L 43/0835; H04L 49/557; H04L 49/9057
See application file for complete search history.

(56) References Cited

U.S. PATENT DOCUMENTS

| | | | |
|---|---|---|---|
| 2014/0269731 A1* | 9/2014 | DeCusatis | H04L 49/9057 370/394 |
| 2015/0142932 A1* | 5/2015 | Hallivuori | H04L 41/0803 709/220 |

(Continued)

FOREIGN PATENT DOCUMENTS

EP    2 874 354 A1    5/2015

OTHER PUBLICATIONS

Openflow Switch Specification Version 1.3.2 (Wire Protocol 0x04); Open Networking Foundation—Apr. 25, 2013.

(Continued)

*Primary Examiner* — Awet Haile
(74) *Attorney, Agent, or Firm* — Sage Patent Group

(57) ABSTRACT

A method of providing state synchronization between a controller and a switch in a communications network, wherein the controller provides flow data for routing flows through the switch and transmits, in flow modification messages, the flow data to the switch for storage in flow tables, the state synchronization comprising ensuring that flow data in the flow tables of the switch are consistent with the flow data provided by the controller. The method comprises, by the controller (19), providing (21) an identifier in each flow modification message. The method further comprises, upon reestablishment of communications (22) between the controller and the switch after a loss of connectivity receiving (23) a resynchronization message from the switch, wherein the resynchronization message comprises an identifier indication capable of being used to (Continued)

identify an identifier of a most recently received message, determining (24) if all transmitted messages have been received by the switch by comparing the identifier indication with an identifier of a most recently transmitted flow modification message, identifying (25) flow modification messages transmitted after the most recently received message as "un-received" messages and retransmitting (26) un-received messages.

19 Claims, 18 Drawing Sheets

(56) References Cited

U.S. PATENT DOCUMENTS

2017/0078184 A1* 3/2017 Tang ................. H04L 45/02
2017/0324781 A1* 11/2017 Hu .................. H04L 63/0227

OTHER PUBLICATIONS

Openflow Switch Specification Version 1.5.0 (Protocol version 0x06); Open Networking Foundation—Dec. 19, 2014.
International Search Report for International application No. PCT/EP2015/076109—dated Aug. 3, 2016.

* cited by examiner

STATE SYNCHRONIZATION BETWEEN A CONTROLLER AND A SWITCH IN A COMMUNICATIONS NETWORK

PRIORITY

This nonprovisional application is a U.S. National Stage Filing under 35 U.S.C. § 371 of International Patent Application Serial No. PCT/EP2015/076109 filed Nov. 9, 2015 and entitled "STATE SYNCHRONIZATION BETWEEN A CONTROLLER AND A SWITCH IN A COMMUNICATIONS NETWORK."

TECHNICAL FIELD

The present disclosure relates to state synchronization between a controller and a switch in a communications network.

BACKGROUND

More than ever, data centers are attracting increasing interest as several network functionalities are expected to be provided by servers according to the Network Function Virtualization (NFV) paradigm. Data centers are also the places where the "Cloud" has its computational and storage engines. However, there are still a lot of challenges to be solved in data center deployments, especially on performance, energy efficiency, resiliency, scalability, and on how to efficiently transport data inside a data center and among data centers.

One of the main issues of data centers is that there are tens of thousands of individual flows simultaneously exchanged among machines. Not only is the volume of flows a challenge to network control, but the fact that they need to be continually updated. In order to achieve this, a common approach is to decouple the control function from the forwarding mechanism by the abstraction of forwarding functionalities. FIG. 1 is a schematic diagram of a typical arrangement, illustrating a controller (1), a switch (2) and a connecting link (3). The switch has a plurality of flow tables that are used to perform packet lookup and forwarding. Each entry in a flow table typically comprises match fields (e.g. ingress port, source address, etc.), counters and instructions (e.g. forward the packet to a given port, drop the packet, continue the processing in the next table, etc.) that are applied to matching packets. The controller (1) can add, update and delete flow entries in the flow tables.

The connecting link (3) may use the OpenFlow protocol. Initially OpenFlow (OF) was used in research and academic areas and has been used as an enabler for network demonstrations in experimental fields, but it is now finding its way into the market. OF is well suited for data centers due to the relatively low-priced hardware and high flexibility.

Typically, the switch initiates a Transmission Control Protocol (TCP) connection to the controller using the transport port 6653. When an OF connection is first established each side of the connection sends a HELLO message for protocol version negotiation. After the switch (2) and the controller (1) have exchanged HELLO messages and successfully negotiated a common version number, the controller sends a FEATURES_REQUEST message to identify the switch and read its basic capabilities and the switch responds with an FEATURES_REPLY message.

FIG. 2 is a signaling diagram illustrating this process. The controller (1) sends a HELLO message (4) to the Switch and the Switch (2) sends a HELLO message (5) to the Controller. A FEATURES_REQUEST message (6) is sent to the switch by the controller and the switch replies with a FEATURES_REPLY message (7). OF connection maintenance is done by the underlying TCP connection mechanisms and by periodic ECHO messages exchange. Flow modification messages are sent from the switch to the controller to modify entries in the latter's flow entries, when a change in packet forwarding is required.

An issue arises when a break in the link (3) between the switch and the controller occurs. A loss of IP connectivity can be caused by a failure in the data center internal network, including hardware or software faults or can be caused by network overload or other events. It may also be required for software or hardware upgrade.

A break in the connection between controller (1) and switch (2) means that the switch does not receive flow modification messages from the controller. After a disconnection the switch must immediately enter in one of the following modes, depending upon configuration:

"fail secure" mode: the only change to switch behavior is that packets and messages destined to the controllers are dropped.

"fail standalone" mode: the switch is free to use flow tables in any way it wishes, the switch may delete, add or modify any flow entry.

While disconnected, the switch periodically attempts to re-establish the connection to the controller. When the OF channel is re-established, it is necessary to re-synchronize the states of the switch and the controller, i.e. ensure that the flow tables in the switch have entries corresponding to the flow modification messages which have been sent to it by the controller. In order to achieve this synchronization, the controller (1) has two options:

1. Retrieve all flow entries with a FLOW_STATS_REQUEST to re-synchronize its state with the switch state.
2. Delete all flow entries with a FLOW_MOD request to start from a clean state on the switch. Then, reinstall all flows.

FIG. 3 is a signaling diagram for the first option. The process starts with a FLOW_STATS_REQUEST message (8) from the controller to the Switch. This asks the switch to provide the current status of its flow tables. The switch responds with a FLOW_STATS_REPLY message (9) for each of its flow entries. The total resynchronization time $T_{sync1}$ (10) is from the sending of the FLOW_STATS_REQUEST message to the receipt of the last FLOW_STATS_REPLY. By this process, the status of the switch's flow tables is reconstructed by the controller.

FIG. 4 is a signaling diagram for the second option. The process starts with a FLOW_MOD_DELETE (11) message being sent from the controller to the switch, instructing the latter to delete all its flow table entries. New FLOW_MOD messages (12) are then sent to the Switch. A FLOW_MOD message is sent for every flow entry. The synchronization time $T_{sync2}$ (10) starts with the sending of the FLOW_MOD_DELETE message and ends with the receipt of the last FLOW_MOD message.

Both options are time and bandwidth consuming and scale with the number of flows. In a data center there would be tens of thousands of individual flows running through a network at any given moment. Throughout the re-synchronization phase, the switch is not operational and cannot be used for new services or traffic recovery.

SUMMARY

Accordingly, in a first aspect of the present disclosure there is provided a controller configured to control a switch in a communications network, wherein the controller is configured to transmit to the switch a plurality of flow modification messages comprising flow data for routing flows through the switch. The controller comprises an identifier providing unit arranged to provide an identifier in each flow modification message, a receiving unit configured to receive a resynchronization message from the switch upon reestablishment of communications between the controller and the switch after a loss of connectivity, wherein the resynchronization message comprises an identifier indication for indicating a said identifier of the flow modification message most recently received by the switch, a determining unit configured to determine which one or more of the flow modification message(s) have not been received by the switch based on the received identifier indication, and a retransmission unit configured to retransmit the one or more flow modification messages determined not to have been received by the switch.

In an embodiment, the controller is configured for a network where network control and forwarding are decoupled through abstraction of forwarding functionalities.

In an embodiment, the controller is a Software Defined Network, SDN, controller.

In an embodiment the controller is configured to transmit to and receive from the switch OpenFlow messages.

In an embodiment, the controller is configured to determine whether the resynchronization message comprises a said identifier indication, and, if not, to resynchronize a switch state and a controller state by a complete exchange of flow table data between the switch and the controller.

In an embodiment the controller is configured to resynchronize a switch state and a controller state by a complete exchange of flow table data by sending a flow data request to the switch and receiving flow data from the switch, or, further configured to resynchronize a switch state and a controller state by a complete exchange of flow table data by sending a flow delete message to the switch and re-sending to the switch each flow modification message.

In a second aspect of the present disclosure, there is provided a switch for use in a communications network, operative to receive from a controller a plurality of flow modification messages comprising flow data for routing flows through the switch. The switch comprises a flow modification message receiving unit for receiving from the controller a plurality of flow modification messages comprising an identifier and a transmitting unit for, on reestablishment of communications between the controller and the switch after a loss of connectivity, transmitting to the controller a resynchronization message comprising an identifier indication capable of being used to identify an identifier of a most recently received flow modification message.

In a third aspect of the present disclosure, there is provided a method of providing state synchronization between a controller and a switch in a communications network, wherein the controller provides flow data for routing flows through the switch and transmits, in flow modification messages, the flow data to the switch for storage in flow tables. The method comprises, by the controller, providing an identifier in each flow modification message. Upon reestablishment of communications between the controller and the switch after a loss of connectivity, the method further comprises receiving a resynchronization message from the switch, wherein the resynchronization message comprises an identifier indication capable of being used to identify an identifier of a most recently received flow modification message, determining if all transmitted flow modification messages have been received by the switch by comparing the identifier indication with an identifier of a most recently transmitted flow modification message, identifying flow modification messages transmitted after the most recently received flow modification message as "un-received" messages and retransmitting un-received messages. In some examples, the state synchronization comprising ensuring that flow data in the flow tables of the switch are consistent with the flow data provided by the controller.

In an embodiment, the method is used in a controller of a network wherein a network control and a forwarding are decoupled through an abstraction of forwarding functionalities.

In an embodiment the method comprises transmitting to and receiving from the switch OpenFlow messages.

In an embodiment only unreceived flow modification messages are re-transmitted.

In an embodiment the method determines whether the resynchronization message identifies an identifier of a most recently received flow modification message. If it is not, the method further comprises resynchronizing a switch state and a controller state by a complete exchange of flow table data between the switch and the controller.

In an embodiment, resynchronizing the switch state and the controller state comprises sending a flow data request to the switch and receiving flow data from the switch.

In an embodiment, resynchronizing the switch state and the controller state comprises sending a flow delete message to the switch and re-sending to the switch each flow modification message.

In a fourth aspect of the present disclosure, there is provided a method of providing state synchronization between a controller and a switch in a communications network, wherein the controller provides flow data for routing flows through the switch and transmits, in flow modification messages, the flow data to the switch for storage in flow tables. The method comprises, by the switch, receiving from the controller a plurality of flow modification messages comprising an identifier. The method further comprises, on reestablishment of communications between the controller and the switch after a loss of connectivity, transmitting to the controller a resynchronization message comprising an identifier indication capable of being used to identify an identifier of a most recently received flow modification message. In some examples, the state synchronization comprising ensuring that flow data in the flow tables of the switch are consistent with the flow data provided by the controller In a fifth aspect of the present disclosure, there is provided an apparatus for use in a controller in a communications network wherein the controller provides flow data for routing flows through a switch and transmits, in flow modification messages, the flow data to the switch for storage in flow tables, the apparatus comprising processor circuitry, a memory containing instructions executable by the processor circuitry, a transmitter and a receiver. The apparatus is operative to provide an identifier in each flow modification message. Upon reestablishment of communications between the controller and the switch after a loss of connectivity, the apparatus is further operative to receive a resynchronization message from the switch, wherein the resynchronization message comprises an identifier indication capable of being used to identify an identifier of a most recently received flow modification message, and to determine if all transmitted flow modification messages have been received by the switch by comparing the identifier indication with an identifier of a most recently transmitted flow modification message, to identify flow modification messages transmitted after the most recently received flow modification message as "un-received" messages and to retransmit un-received messages. This has the advantage of allowing the retransmission of only unreceived messages, saving both bandwidth and resynchronization time.

In a sixth aspect of the present disclosure, there is provided an apparatus for use in a switch in a communications network, wherein a controller provides flow data for routing flows through the switch and transmits, in flow modification messages, the flow data to the switch for storage in flow tables, the apparatus comprising processor circuitry, a memory containing instructions executable by the processor circuitry, a transmitter and a receiver. The apparatus is operative to receive from the controller a plurality of flow modification messages comprising an identifier. On reestablishment of communications between the controller and the switch after a loss of connectivity, the apparatus is further operative to transmit to the controller a resynchronization message comprising an identifier indication capable of being used to identify an identifier of a most recently received flow modification message.

In a seventh aspect of the present disclosure, there is provided a computer program, comprising instructions which, when executed on at least one processor, cause the at least one processor to carry out a method according to the third or fourth aspects of the disclosure.

In an eighth aspect of the present disclosure, there is provided a computer program product comprising a computer program according to the seventh aspect.

BRIEF DESCRIPTION OF THE DRAWINGS

The above and other aspects of the present disclosure will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure.

Rather, the following embodiments are provided by way of example so that this disclosure will be thorough and complete, and will fully convey the scope of the disclosure to those skilled in the art.

The present disclosure seeks to overcome the problem of the time consuming and bandwidth hungry re-synchronization process by reducing the number of flow messages sent during the resynchronization process. To achieve this, an identifier is introduced to identify each flow modification message. This enables, at re-synchronization, flow messages which have been successfully received by the switch to be distinguished from those which have not been successfully received. This allows flow modification messages to be retransmitted if they have not been received, hence reducing the synchronization time and the bandwidth required for implementing re-synchronization. Flow modification messages are not transmitted when this is not required, reducing the number of flow modification messages transmitted.

Prior art methods of resynchronization are based on a perceived need to have a method capable of resynchronization that can respond to both fail secure and fail standalone configurations. The present disclosure recognises that separate methods can be used to respond to the two configurations, thus allowing a significant saving in bandwidth and resynchronization time for systems configured in fail secure, whilst reverting to a conventional method for fail standalone.

Figure 1:
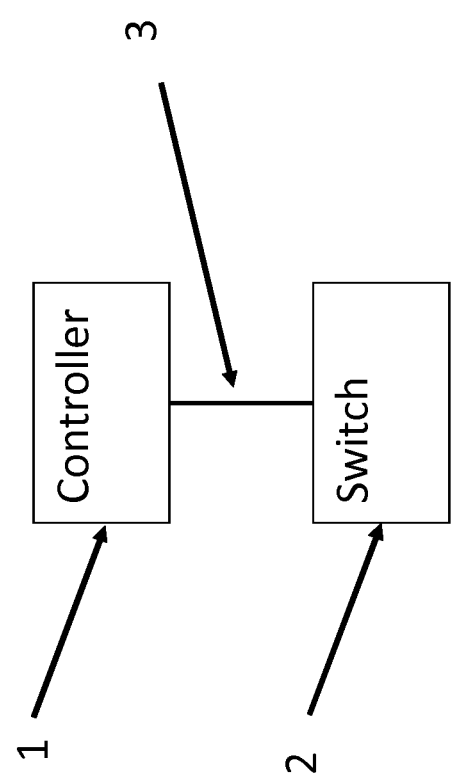
FIG. 1 is a schematic diagram of a controller and a switch according to the prior art.
Figure 2:
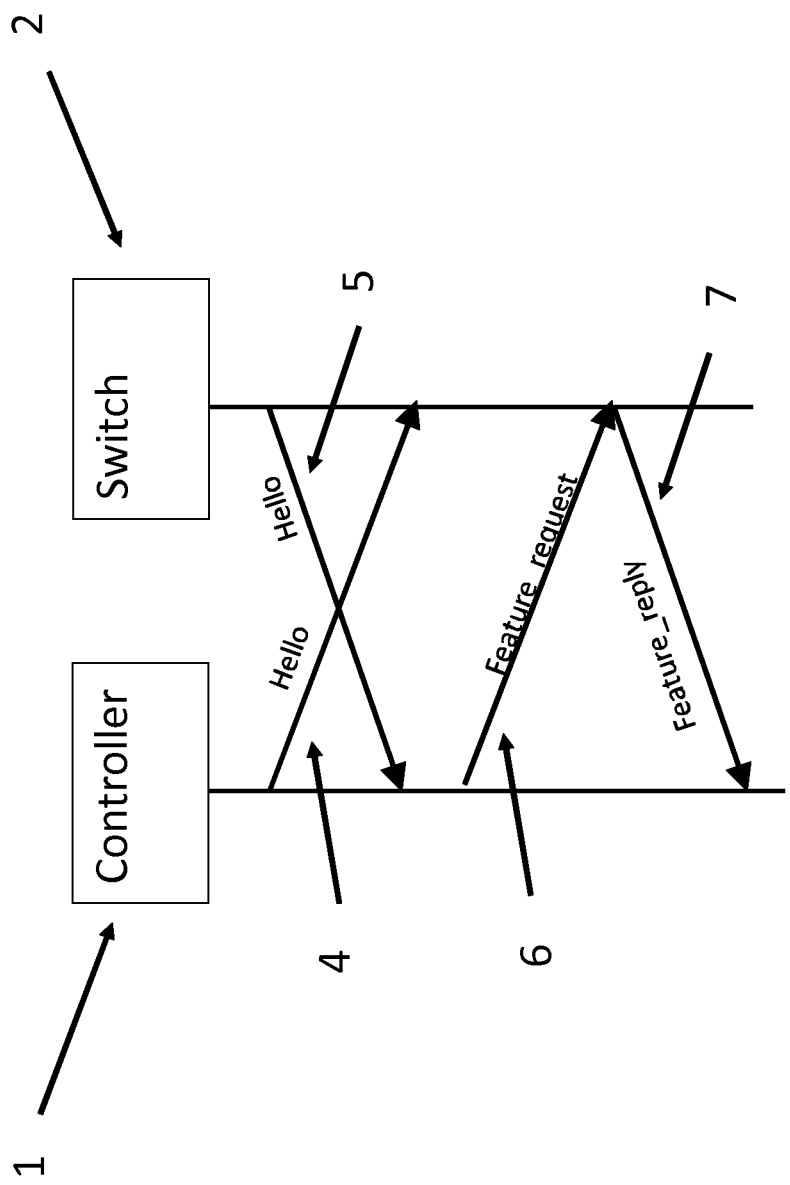
FIG. 2 is a signalling diagram for the set-up of a connection between a controller and a switch according to the prior art.
Figure 5:
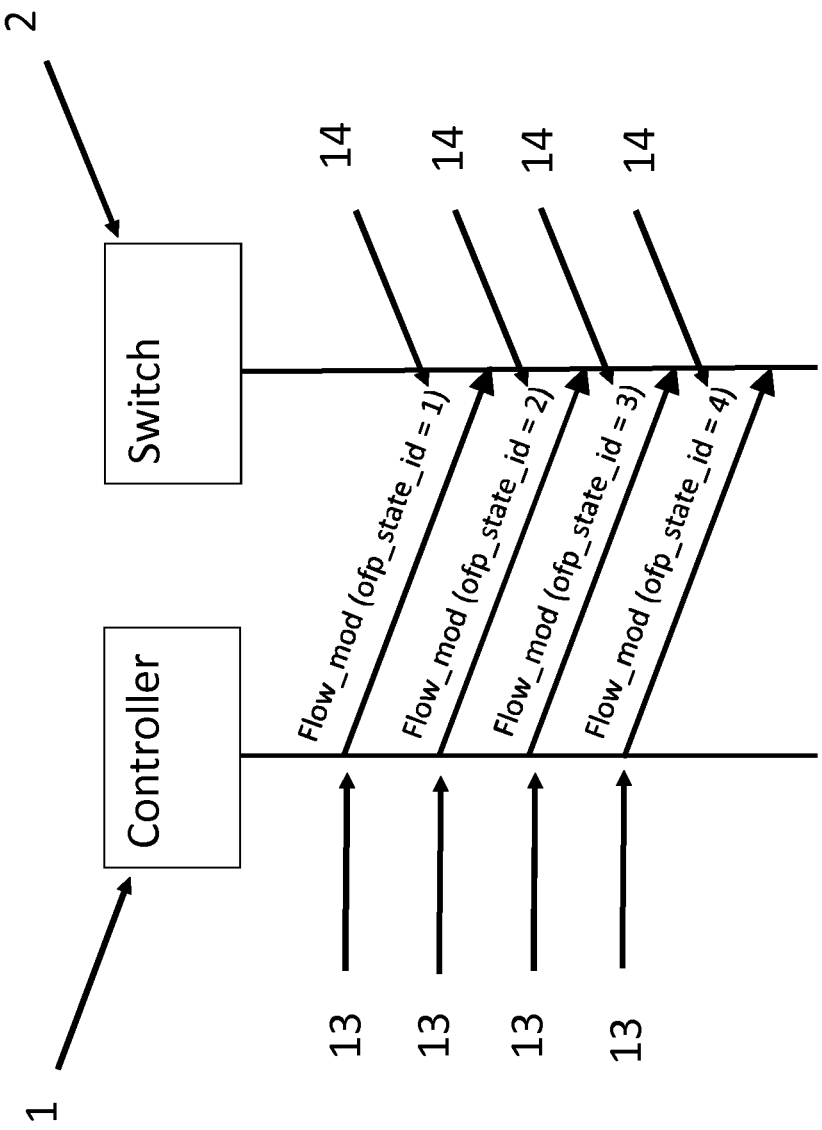
FIG. 5 is a signalling diagram for a method of providing flow identifiers according to an embodiment.

FIG. 5 is a signalling diagram illustrating providing an identifier into each of the flow modification messages sent by the controller to the switch during normal operation. The controller (1) and switch (2) are connected by the connecting link (3), as shown in FIG. 1. In some examples, the controller (1) is a Software Defined Networking (SDN) controller. The switch (2) may be considered as a SDN switch, controlled by the controller. The controller and switch may be considered a part of a data center, e.g. a SDN controlled data center. In some examples, the controller may be considered as a Cloud SDN controller.

In an example of the present disclosure, each flow modification message (13) comprises an identifier (14) (ofp_state_id). In the embodiment shown, the identifier is a single integer, which is incremented for each new flow modification message. For example, the identifier ofp_state_id has the values 1, 2, 3, ... N, in sequence. In some aspects, the identifiers are consecutive values in a sequence, e.g. the sequence of numbers. The sequence may have a final or maximum value, e.g. maximum number, at which the next identifier rolls over to the initial or minimum value. Such identifiers may still be considered as consecutive in the sequence. The person skilled in the art will appreciate that an increment of an integer is only one of many different options for implementing the identifier. In another embodiment for example, the integer may be decremented, any mutually known sequence of a code may be used. Any method may be used provided that the temporal sequence of flow modification messages may be recognised. In an embodiment, a history of flow modification messages is maintained at the controller.

When a disconnection (i.e. communication fault) between the controller (1) and the switch (2) occurs, the switch and the controller will periodically attempt to regain contact with each other. In some aspects, the switch is configured to function in a fail secure mode of operation until connection is re-established with the controller. Once a successful reconnection has occurred, the controller sends a HELLO message to the switch. In the present method, the switch responds by sending to the controller an identifier indication capable of being used to identify the identifier of the last flow modification message received by the switch. In an embodiment, the identifier indication is sent in a HELLO message. The controller (1) is configured to receive the identifier from the switch (2), and determine the last flow modification message that was received by the switch based on the identifier.

Figure 6:
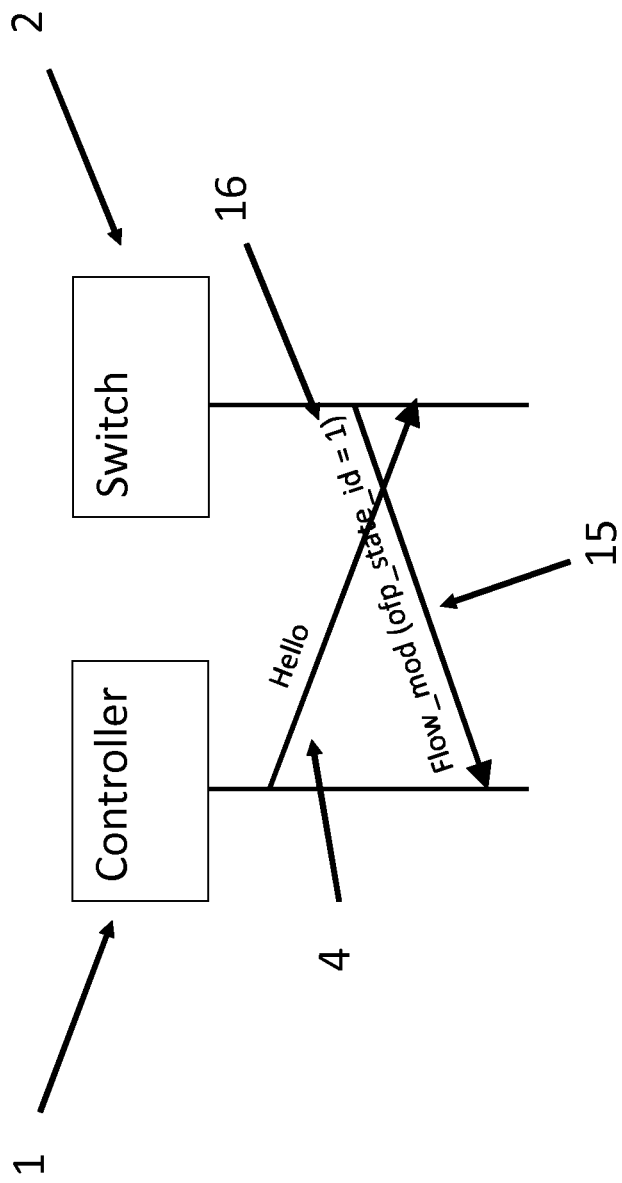
FIG. 6 is a signalling diagram for a method of providing a resynchronization message according to an embodiment.

FIG. 6 is a signalling diagram illustrating the process of informing the controller of the identifier of the last flow modification message to be received. The controller (1) sends a HELLO message (4). The switch sends a hello message (15) comprising an indication (16) that can be used by the controller to identify the last received flow modification message. In an embodiment the identifier indication can be the identifier of the last received flow modification message. In another embodiment this may be another indication, such as the number of identifiers received since a given point in time. In another embodiment the identifier indication may be the next identifier in a sequence after that of the last received flow modification message, i.e. the next expected flow modification message identifier. The person skilled in the art will appreciate that there are a large number of options and the disclosure is not limited to any one method of indicating the last received flow modification message, so long as it is capable of allowing recognition of the last received flow modification message at the controller.

In an embodiment, the HELLO message (16) from the switch to the controller is sent in response to a HELLO message from the controller. In another embodiment, the HELLO message comprising the identifier indication is sent as part of the reconnection process. In an embodiment, HELLO messages comprising an indication may be sent multiple times during the reconnection process. In another embodiment, the indication may be sent separately from the HELLO message. The person skilled in the art will appreciate that there are many options for transmitting the identifier indication from the switch to the controller and the disclosure is not limited to any one method.

Once the identifier indication has been received by the controller, the controller identifies which flow modification messages have not been received by the switch. This enables the identification of flow messages which need to be retransmitted. This is achieved by comparing the identifier indication with the identifier of the most recently transmitted flow modification message. In an embodiment, an explicit record of the most recently transmitted flow modification message is kept. In another embodiment, the most recently transmitted flow modification message is recorded implicitly as the last record in a history. The disclosure is not limited to any one way of keeping a record of the most recently transmitted flow modification message. If the identifier indication comprises the identifier of the last received flow modification message, comparing the identifier indication with the identifier of the most recently transmitted flow modification message comprises a comparison of two identifiers. If another method of providing the indication is used, then the process of comparing the identifier indication with the identifier of the most recently transmitted flow modification message comprises a first stage of identifying from the identifier indication the identifier of the last received flow modification message.

Figure 7:
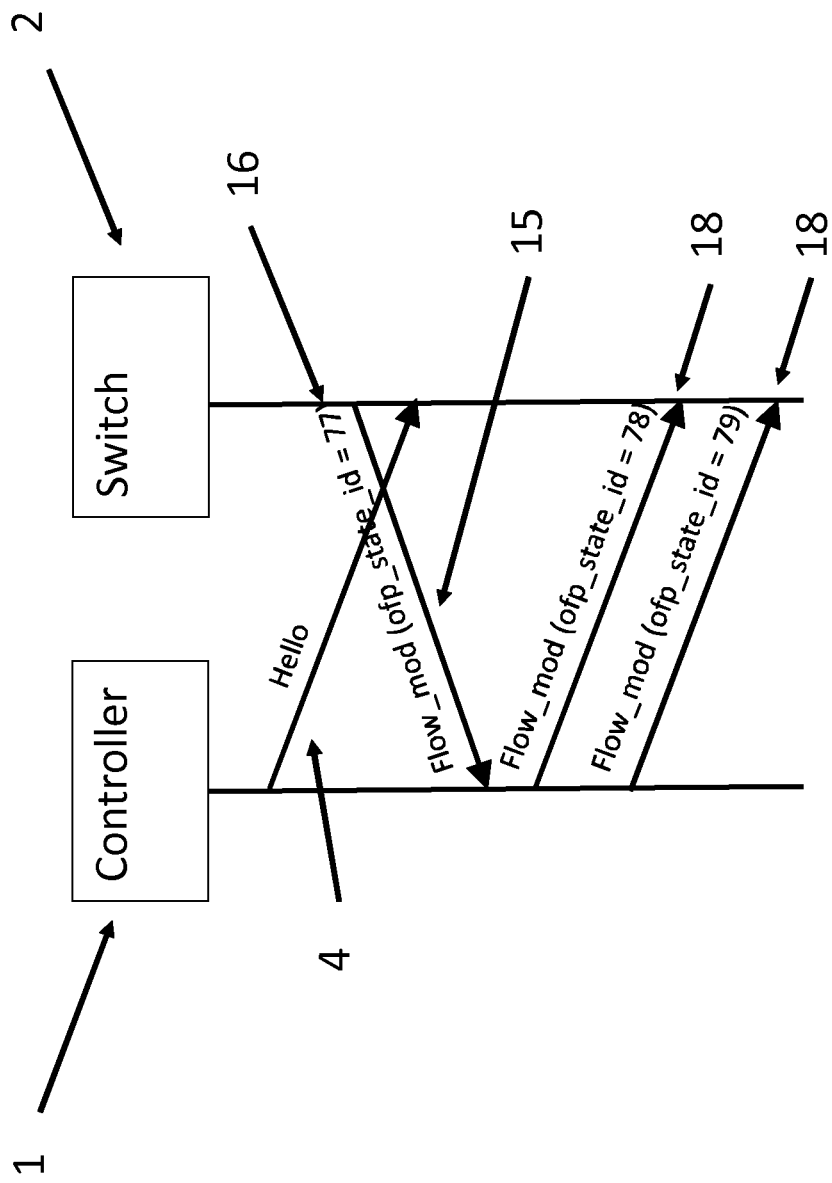
FIG. 7 is a signalling diagram for a method of re-transmitting flow modification messages according to an embodiment.

FIG. 7 is a signalling diagram showing the retransmission of flow modification messages in a method according to an embodiment. After receipt of a HELLO message (15) comprising an identifier indication (16), the controller identifies the flow modification messages which need to be retransmitted. In the example shown, the identifier of the last received flow modification message from the switch (2) has a value of 77. In this example, the controller has a stored record that a flow modification message with a subsequent value was transmitted, e.g. a value of 79. Such subsequent flow modification messages are determined by the controller not to have been received by the switch (2). In this example, the controller identifies flow modification messages with respective identifiers 78 and 79 as having not been received and retransmits them (18). In an embodiment of the disclosure, only flow modification messages identified by the controller (1) as unreceived are retransmitted. Thus, the controller (1) does not re-transmit all flow modification messages. Only a subset of the flow modification messages are re-transmitted, e.g. corresponding to those flow modification messages which are determined not to have been received by the switch (2) based on the received identifier value. However, the person skilled in the art will appreciate that there may be instances when other flow modification messages may be retransmitted in addition to those identified as unreceived, and the disclosure is not limited to the retransmission of only unreceived flow modification messages.

Figure 8:
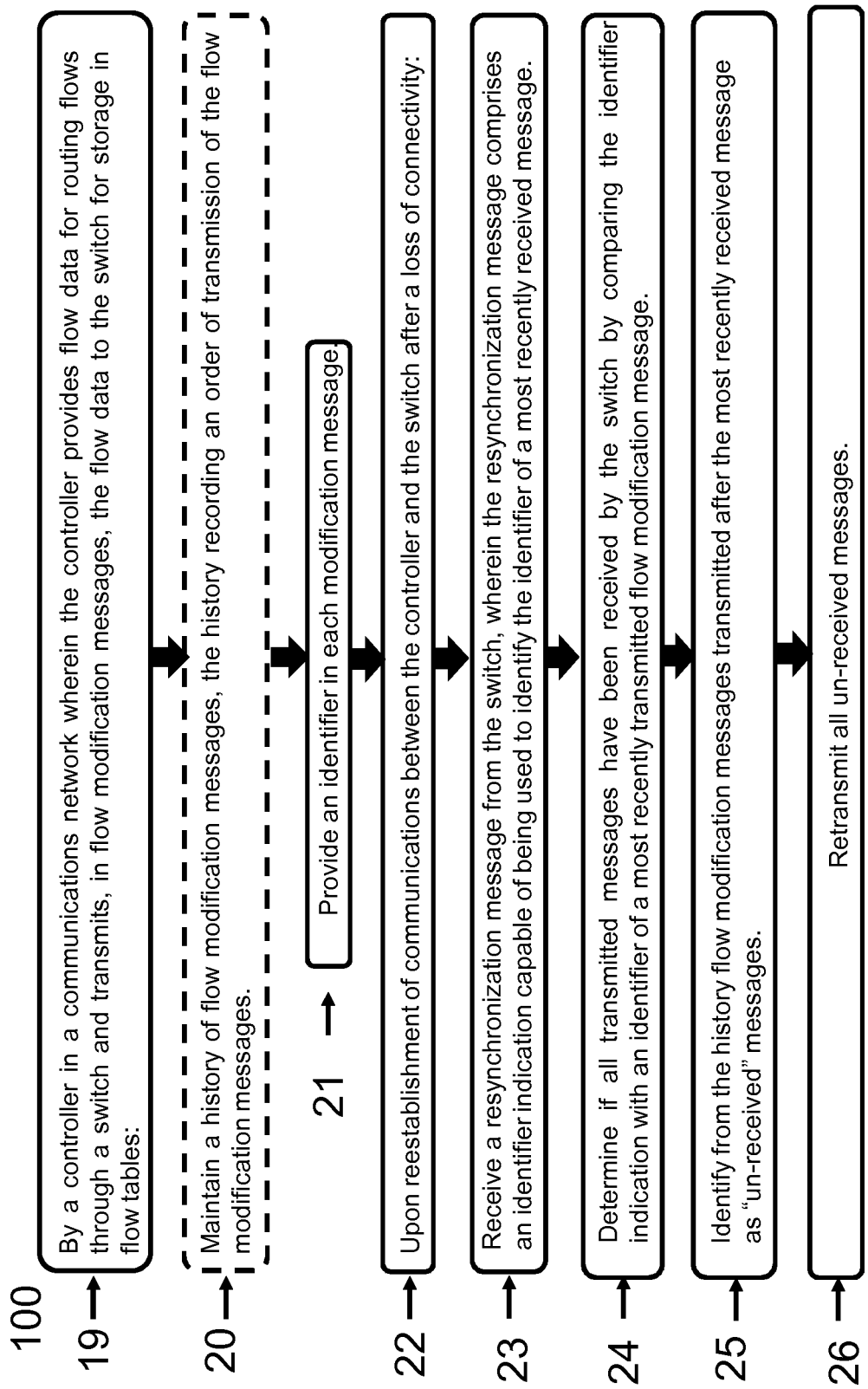
FIG. 8 is a flow chart illustrating a method of re-synchronization according to an embodiment.

FIG. 8 is a flow chart illustrating a method (100) according to an embodiment. The method is implemented by a controller (1) in a communications network, wherein the controller provides (19) flow data for routing flows through a switch (2) and transmits, in flow modification messages, the flow data to the switch for storage in flow tables. In an embodiment, a history of flow modification messages is maintained (20). The history records an order of transmission of the flow modification messages. In each flow modification message sent by the controller to the switch, an identifier is included (21).

Upon re-establishment (22) of communications after loss of connectivity between the controller and the switch, the controller (1) receives (23) a re-synchronization message. The re-synchronisation message provides an identifier indication capable of being used to identify an identifier of a most recently received flow modification message by the switch. The controller then determines (24), by comparing the identifier indication with the identifier of a most recently transmitted flow modification message, whether all the transmitted flow modification messages have been received. For example, if the identifier (value of ofp_state_id) indicating a last flow modification message received by the switch matches (i.e. is the same as) the controller's record of the last flow modification message transmitted to the switch, then no further synchronization actions are required. The controller is then configured to skip the state synchronization procedure.

If the controller determines that the identifier of the last flow modification message received by the switch does not match the last flow modification message transmitted to the switch by the controller, the controller determines that one or more additional flow modification message needs to be re-transmitted in order to synchronize the switch (2) with the controller (1). The controller then identifies (25) any flow modification messages which were transmitted after the most recently received flow modification message as "unreceived". The unreceived messages are then retransmitted (26).

Backward compatibility with systems in which a switch does not have the capability of implementing the disclosure is important in integrating the disclosure with existing networks. In order to achieve this backward compatibility, in an embodiment, the controller determines whether a re-synchronization message comprises an identifier indication capable of being used to identify an identifier of a most recently received flow modification message. If an identifier indication is present, the controller implements a method according to the disclosure. However, if no identifier indication is present, then one of the methods according to the prior art is implemented in order to synchronize a state of the controller with a state of the switch, wherein the state of the controller refers to the flow data recorded at the controller and the state of the switch refers to the current entries of the flow tables of the switch. For example, the convention method comprises a complete exchange of flow data between the controller and the switch. This may involve the deletion of all the flow tables in the switch and the re-sending of all flow modification messages or alternatively the providing of flow data from the switch to the controller.

In an embodiment, if no identifier indication capable is present, then a flow data request message is sent to the controller. Flow data is then received from the switch.

Figure 3:
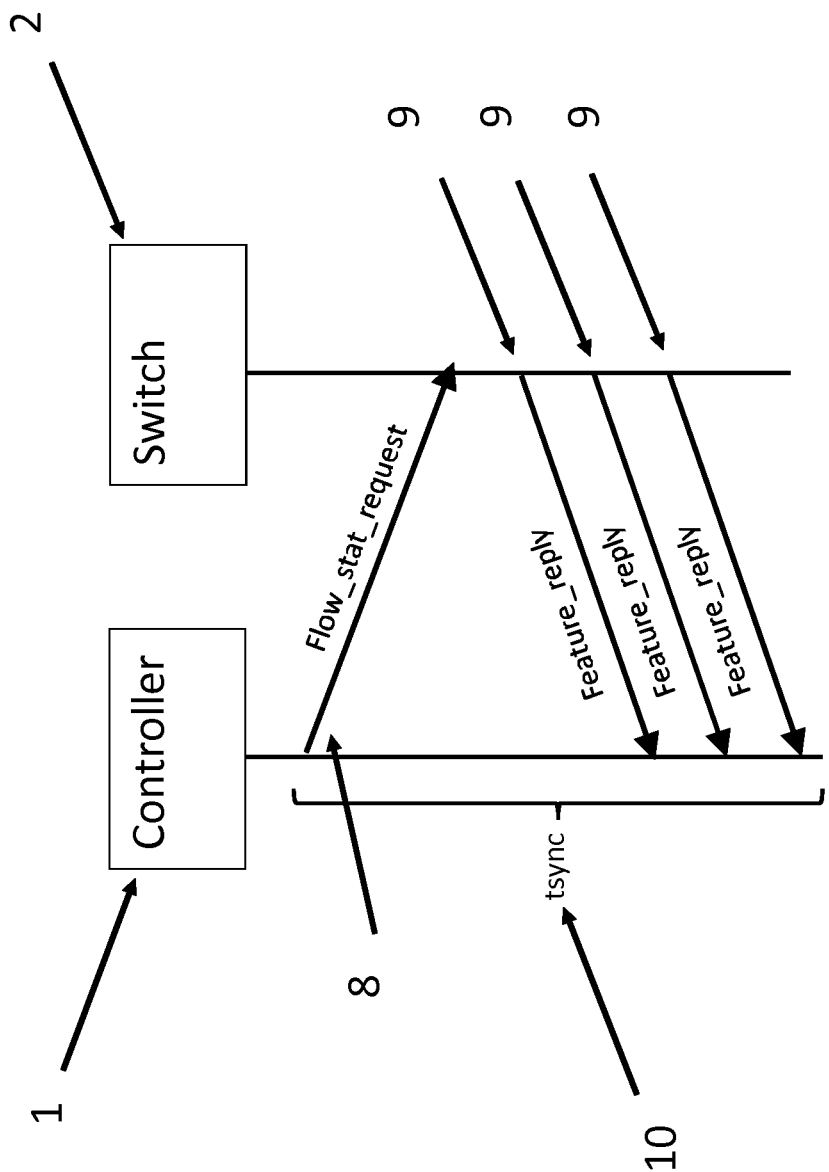
FIG. 3 is a signalling diagram for a re-synchronization method according to the prior art.
Figure 9:
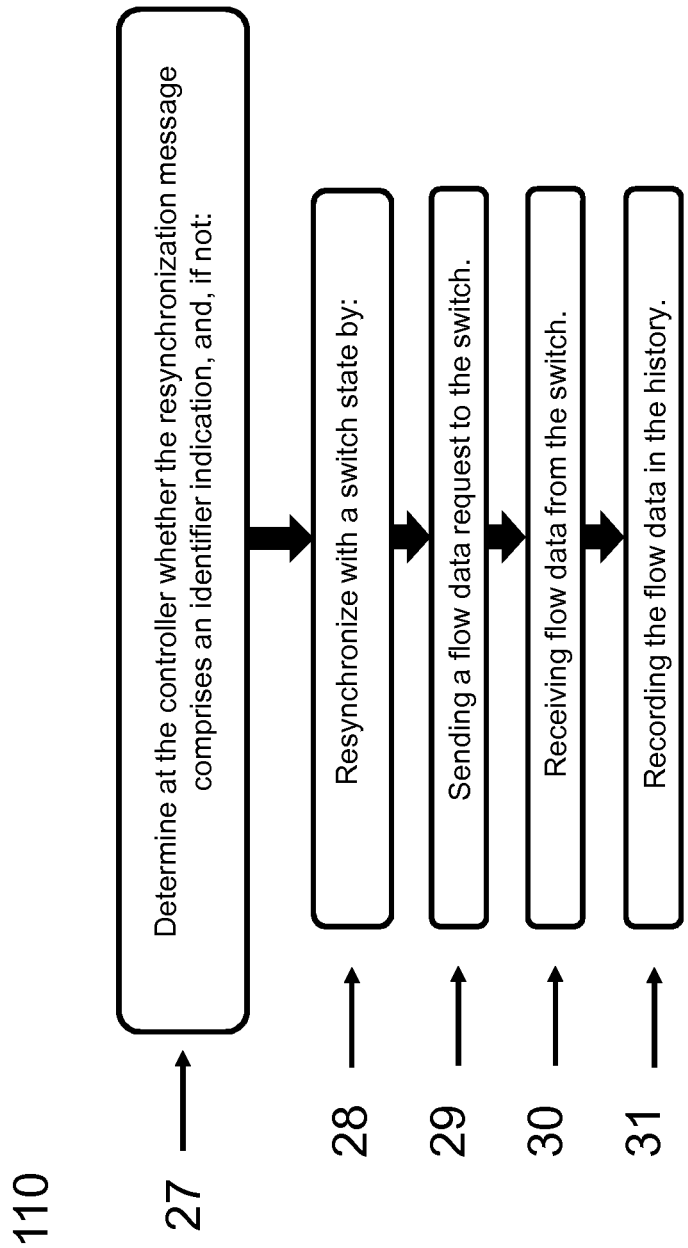
FIG. 9 is a flow chart illustrating a method of providing backward compatibility according to an embodiment.

FIG. 9 is a flow chart illustrating the steps of a method (110) according to this embodiment. The controller determines (27) whether the re-synchronization message comprises an identifier indication. If it does not, then resynchronization is implemented (28) by the steps of sending a flow data request (29), receiving flow data from the switch (30) and recording the flow data in a history (31). The steps 28 to 31 correspond with the example of FIG. 3.

Figure 4:
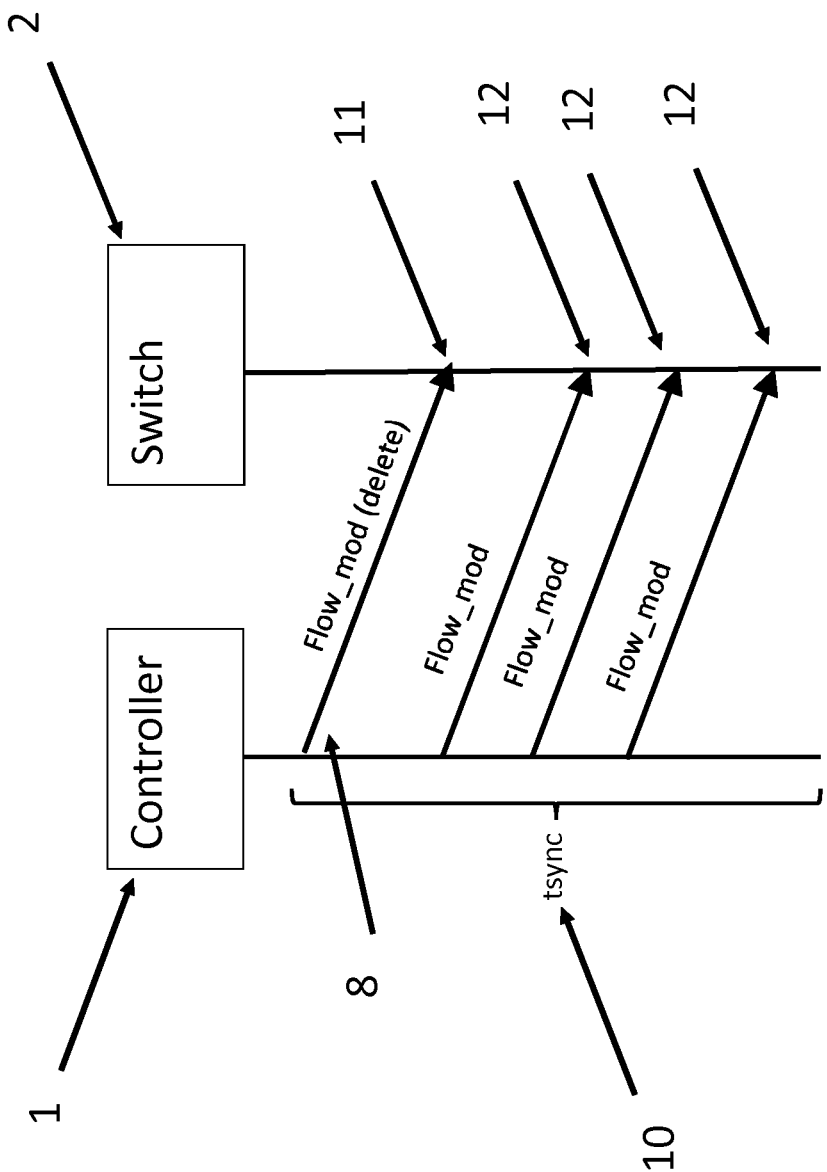
FIG. 4 is a signalling diagram for another re-synchronization method according to the prior art.
Figure 10:
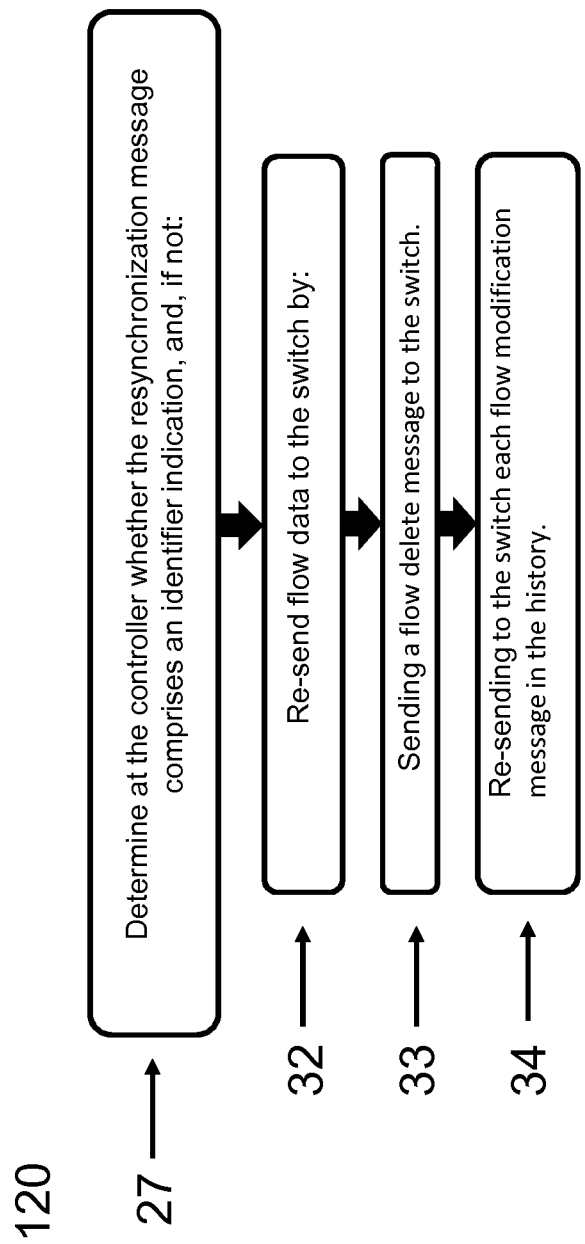
FIG. 10 is a flow chart illustrating a method of providing backward compatibility according to an embodiment.

In another embodiment, if there is no identifier indication in the resynchronisation message, the controller implements re-synchronization by sending a flow modification delete message to the switch. The switch deletes all entries in its flow tables. The controller then retransmits all of the flow modification messages sent. FIG. 10 is a flow chart of the steps of a method (120) according to this embodiment. The controller (1) determines (27) whether the re-synchronization message comprises an indication capable of identifying of the identifier of the most recently received flow modification message. The controller than re-sends (32) flow data to the switch by sending a flow delete message (33), followed by retransmitting (34) each flow modification message. The steps 32 to 34 correspond with the example of FIG. 4.

In a further embodiment the controller may be capable of implementing both the method of the embodiment of FIG. 9 and the embodiment of FIG. 10. The person skilled in the art will appreciate that other methods of re-synchronization may be implemented in response to the absence of an indication capable of identifying the identifier of the most recently received flow modification message. The disclosure is not limited to any one method of response to the absence of an indication of the current state of the switch (2).

Figure 11:
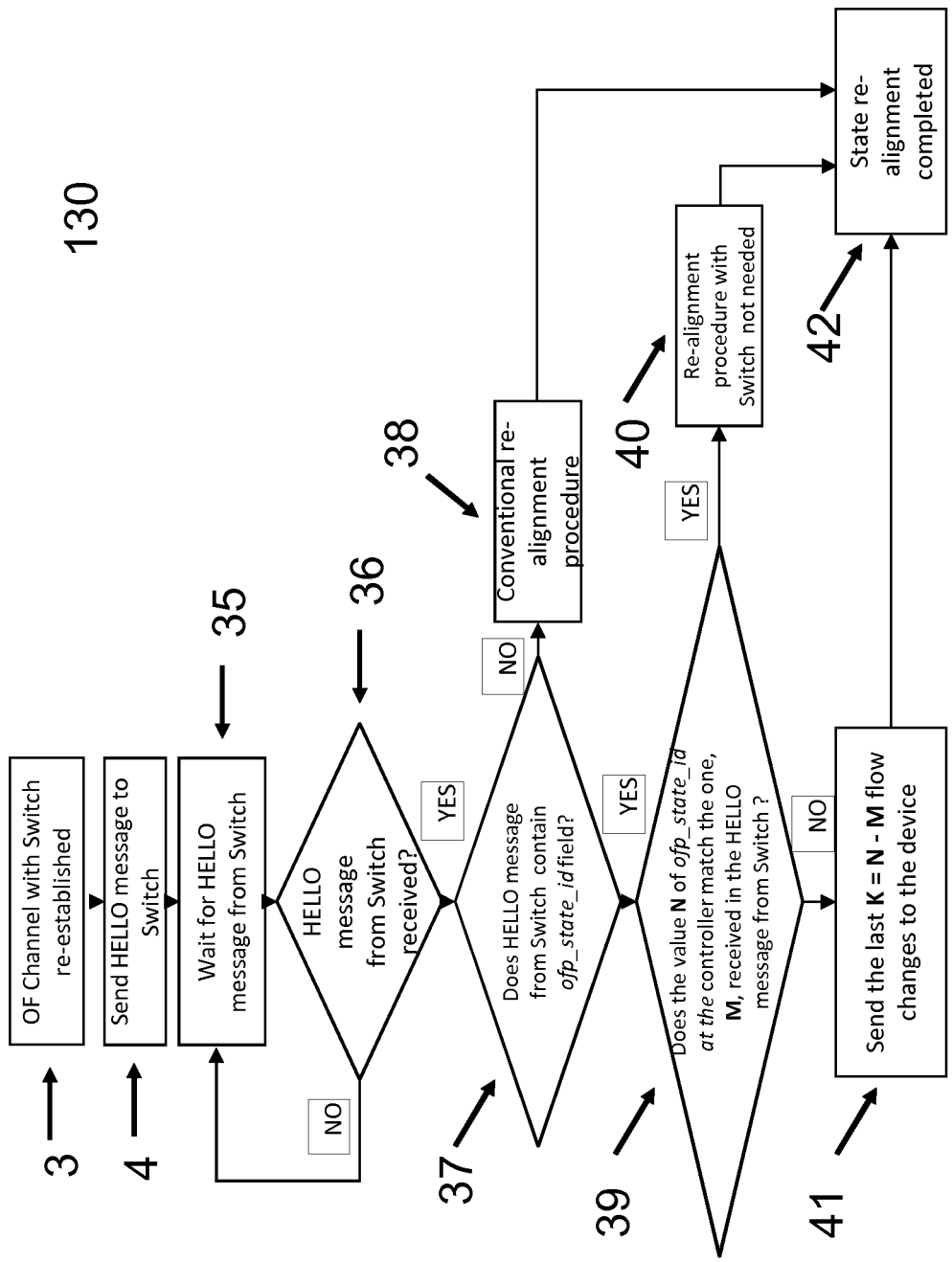
FIG. 11 is a flow chart illustrating a method of providing re-synchronization at the to an embodiment.

FIG. 11 is a flowchart of a method (130) of re-synchronization performed at the controller according to an embodiment. In the embodiment, the OpenFlow protocol is used to communicate between a controller and a switch, although the method may be applicable to other protocols. An increment counter is used to select the identifiers for the flow modification messages sent by the controller. As described, an identifier indication is contained within a HELLO message as an ofp_state_id field, the HELLO message being received by the controller (1) following re-establishment of communication with this switch A value N is used to represent the identifier in the ofp_state_id field and a value M is used to represent the identifier of the last transmitted flow modification message by the controller.

In (3), an OpenFlow (OF) channel is re-established by the controller (1) with the switch (2).

In some examples, a HELLO message is sent to the Switch (4). The controller then waits (35) for a HELLO message from the Switch. When a HELLO message is received (36), a determination is made as to whether the HELLO message The controller determines whether a resynchronization message from the switch comprises an indicator of the current state of the received flow modification messages, e.g. an ofp_state_id field (37). For example, the controller waits (35) for a HELLO message from the Switch. When a HELLO message is received (36), a determination is made as to whether the HELLO message comprises the indicator of the current state of the received flow modification messages. Alternatively, the indicator may be in a different message than the HELLO message.

If the indicator is determined not to be included in the expected received resynchronization message, a conventional realignment is performed (38). If the indicator (e.g. an ofp_state_id field) is present, then a determination is made (39) as to whether the value N of the indicator (e.g. ofp_state_id field) matches the value M stored at the controller for the flow modification messages. If there is a match between N and M, then no realignment procedure is needed (40). If it does not match, then the K most recently transmitted flow modification messages are determined by the controller and re-transmitted (41), wherein K is the subset of transmitted flow modification messages determined not to have been received by the switch (e.g. difference of N and M). The realignment process is then complete (42), e.g. the controller and switch are now synchronized, e.g. flow data is in the same state.

Figure 12:
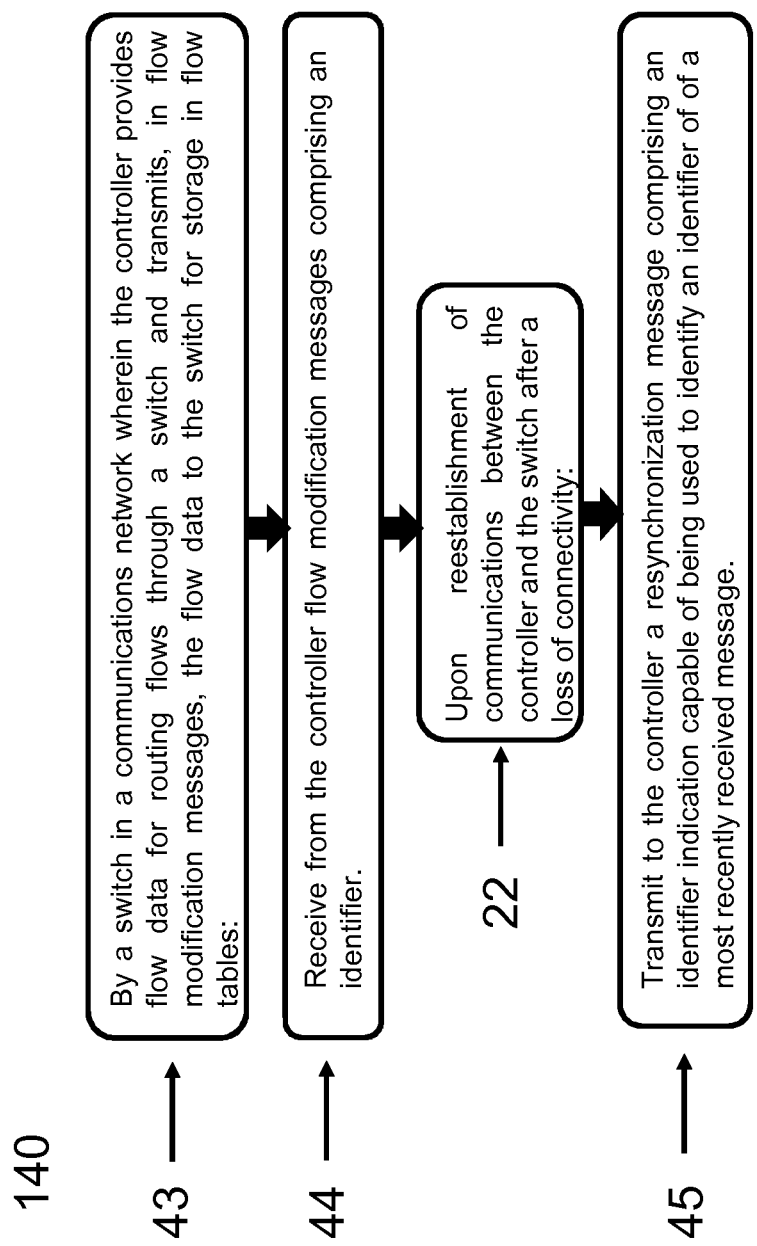
FIG. 12 is a flow chart illustrating a method of providing re-synchronization at the to an embodiment.

FIG. 12 is a flow chart illustrating the steps of the method (140), according to an embodiment, performed by a switch (2) in a communications network. The switch is controlled by a controller (1). The switch (2) receives (43) from the controller a plurality of flow data for routing flows through a switch and transmits, in flow modification messages, the flow data to the switch for storage in flow tables. In (44), the switch receives (44) from the controller a plurality of flow modification messages comprising an identifier. Upon reestablishment of communications (22) between the controller and the switch after a loss of connectivity, the switch transmits (45) to the controller a resynchronization message comprising an identifier indication capable of being used to identify an identifier of a most recently received flow modification message. In an embodiment, the switch stores the identifier of the last flow modification message to be received as a last flow modification message received identifier. This is used to generate the identifier indication for use in a resynchronization message. In an embodiment, the resynchronization message is a HELLO message. Alternatively, the resynchronization message may be a dedicated message for the identifier indication, or may be any message comprising the identifier indication.

Figure 13:
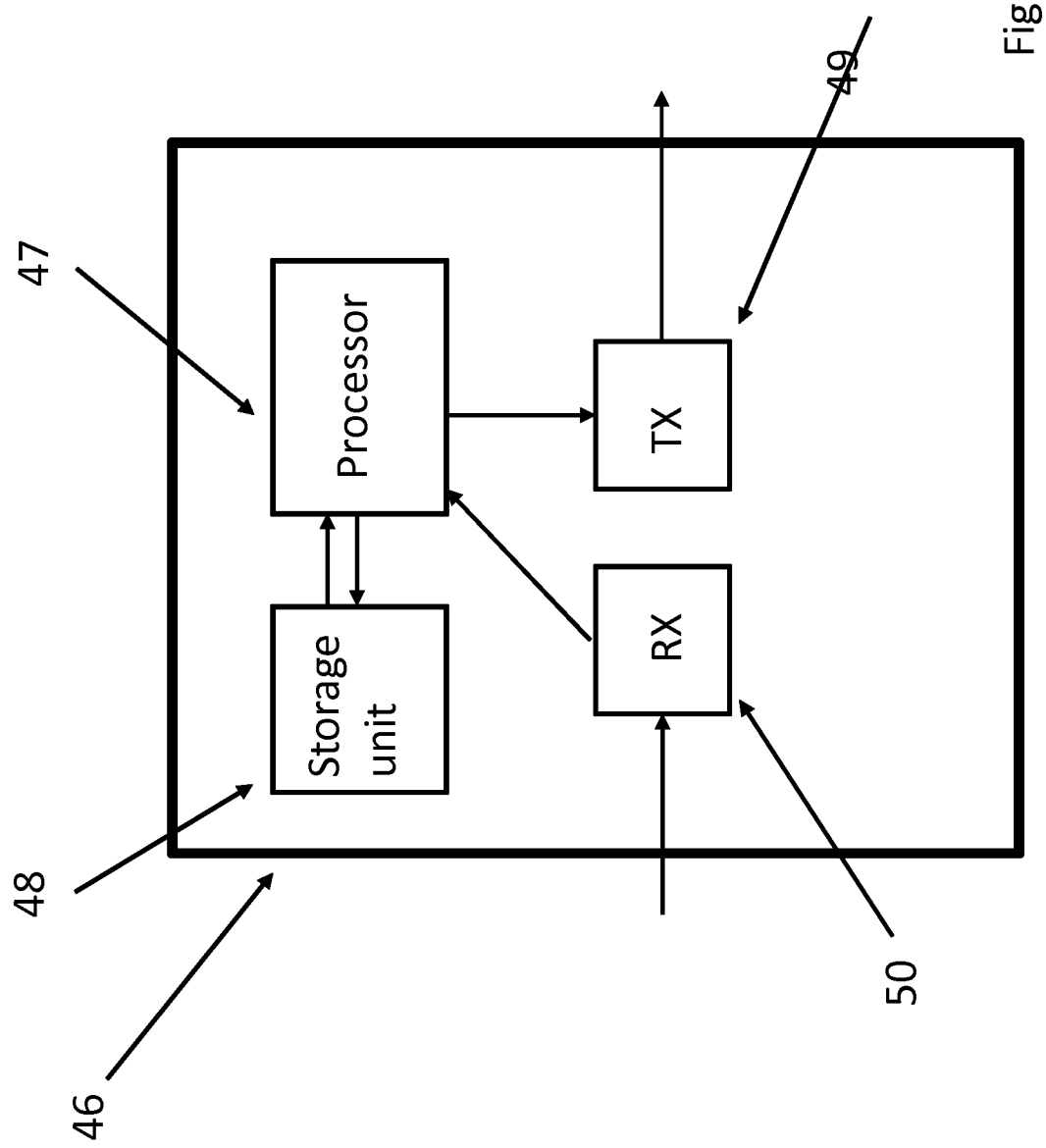
FIG. 13 is an apparatus for use in a controller according to an embodiment.

FIG. 13 is a schematic diagram of an apparatus (46) for use in (or as) a controller (1) in a communications network. The apparatus (46) provides flow data for routing flows through a switch. The apparatus (46) is configured to transmit, in flow modification messages, the flow data to the switch for storage in flow tables. The apparatus (46) comprises processor circuitry (47), a storage unit (48) arranged to store instructions executable by the processor circuitry, a transmitter (49) and a receiver (50). The apparatus is operative provide an identifier in each flow modification message. Upon reestablishment of communications between the controller and the switch after a loss of connectivity, the apparatus (46) is further operative to receive a resynchronization message from the switch (e.g. at the receiver (50), wherein the resynchronization message comprises an identifier indication capable of being used to identify the identifier of a most recently received flow modification message. The processor circuitry (47), which may be termed a processing arrangement or processor, is configured to determine if all transmitted messages have been received by the switch by comparing the identifier indication with an identifier of a most recently transmitted flow modification message. If not, the processor circuitry (47) is configured to identify, flow modification messages transmitted after the most recently received flow modification message as "un-received" messages and control the retransmission of the un-received messages by the transmitter (49).

Figure 14:
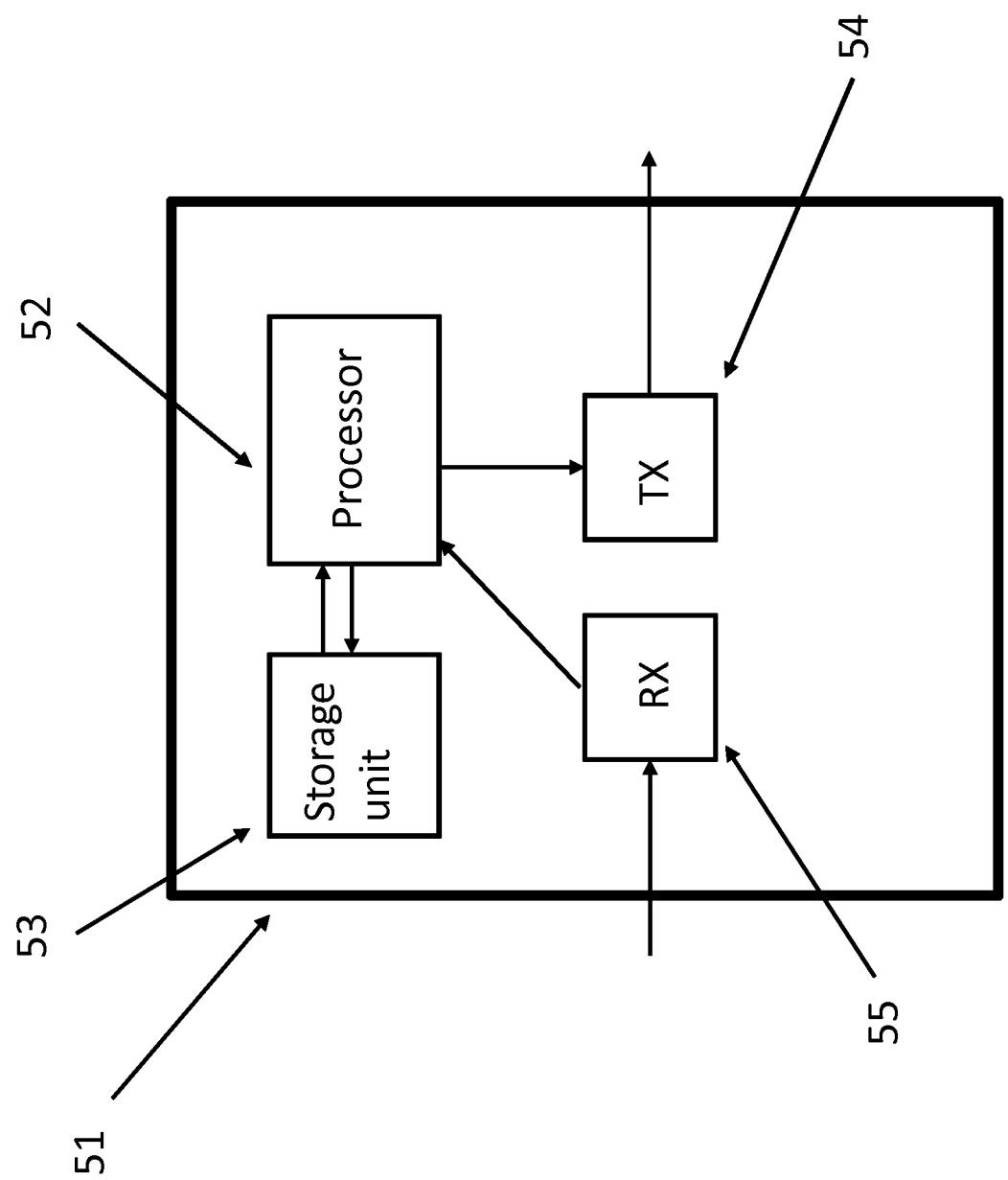
FIG. 14 is an apparatus for use in a switch according to an embodiment.

FIG. 14 is a schematic diagram of an apparatus (51) for use in the switch in the communications network. The apparatus (51) is arranged to receive flow data for routing flows through the switch. The apparatus (51) is arranged to receive, in flow modification messages, the flow data for storage in flow tables. The apparatus (51) comprises processor circuitry (52), which may be termed a processing arrangement or processor, a storage unit (53) configured to store instructions executable by the processor circuitry, a transmitter (54) and a receiver (55). The apparatus is operative to receive (e.g. at the receiver (50) from the controller the flow modification messages comprising an identifier. On reestablishment of communications between the controller and the switch after a loss of connectivity, the apparatus is further configured to transmit to the controller a resynchronization message comprising an identifier indication capable of being used to identify the identifier of a most recently received flow modification message. The processing circuitry (52) is configured to determine the identifier of the most recently received flow modification message, and generate a message to the controller including the identifier or an indication of the identifier. The message (e.g. a HELLO message) is transmitted by the transmitter (54).

Figure 15:
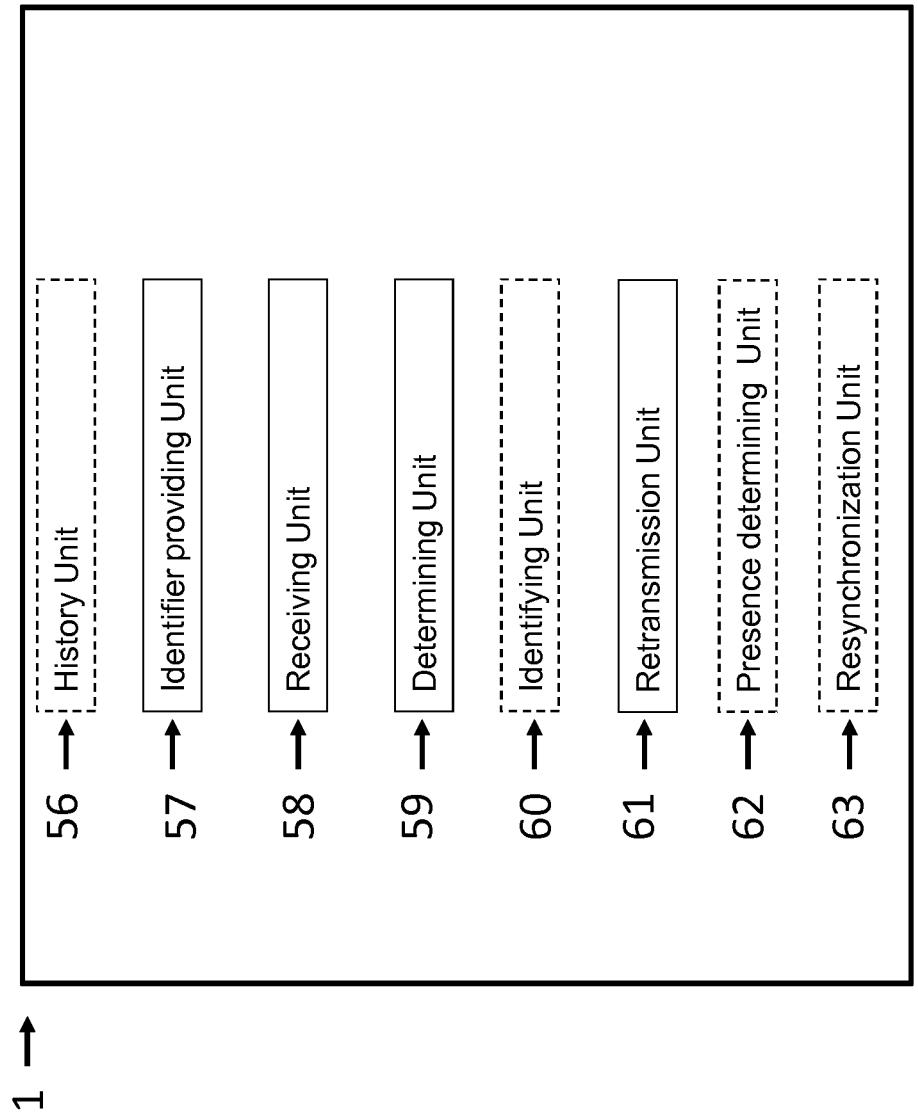
FIG. 15 is a schematic diagram showing a controller comprising functional units according to an embodiment.

FIG. 15 is a schematic diagram showing a controller (1) comprising functional units according to an embodiment. The units are logical units, and may be implemented by any combination of hardware, software or firmware, e.g. by the processing circuitry (47) and storage unit (48) described above. One or more of the units may be integrated into the same hardware, software or firmware, and the separate explanation of the units does indicate a separate implementation or construction.

The controller (1) comprises an Identifier providing unit (57) for providing an identifier in each flow modification message. The controller (1) further comprises a receiving unit (58), for receiving a resynchronization message from the switch, wherein the resynchronization message comprises an identifier indication capable of being used to identify the identifier of a most recently received flow modification message. The controller (1) further comprises a determining unit (59), for determining if all transmitted messages have been received by the switch by comparing the identifier indication with an identifier of a most recently transmitted flow modification message. The controller (1) further comprises a retransmission unit (61) for retransmitting the identified un-received messages to the switch. In an embodiment, the controller (1) further comprises a history unit (56) for maintaining a history of flow modification messages, the history recording an order of transmission of the flow modification messages. In an embodiment, the controller (1) further comprises an identifying unit (60), for identifying, from the history, flow modification messages transmitted after the most recently received message as "un-received" messages.

In some examples, the controller (1) optionally further comprises a presence determining unit (62), for determining whether the resynchronization message identifies an identifier of a most recently received flow modification message. The controller further comprises a resynchronizing unit (63) for resynchronizing the controller and the switch by means of a full exchange of flow data between the switch and the controller, if the identifier is not detected as expected (i.e. the switch is identified as a legacy device).

Figure 16:
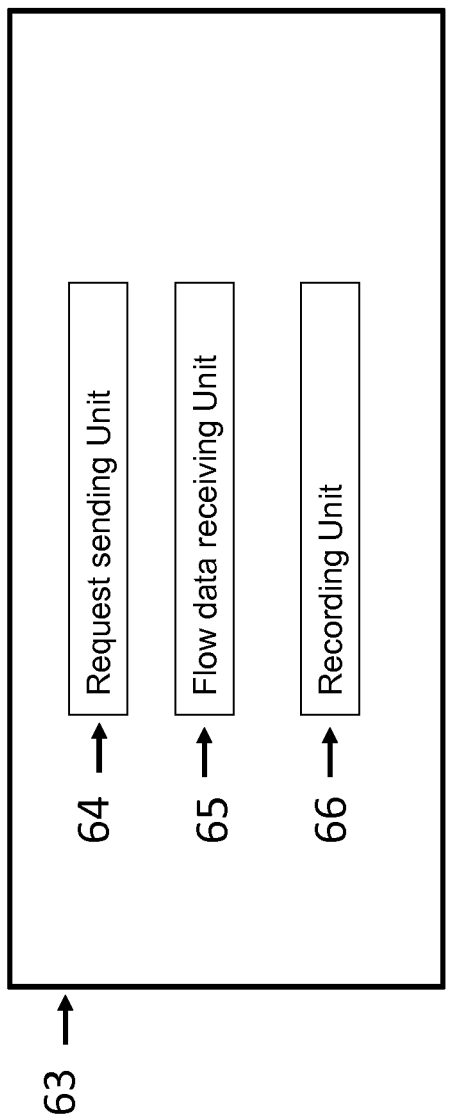
FIG. 16 is a schematic diagram showing a resynchronization unit comprising functional units according to an embodiment.

FIG. 16 is a schematic diagram showing a re-synchronization unit (63) comprising logical units according to an embodiment. The re-synchronization unit comprises a request sending unit (64) for sending a flow data request to the switch, a flow data receiving unit (65) for receiving flow data from the switch, and a recording unit (66) for recording the flow data.

Figure 17:
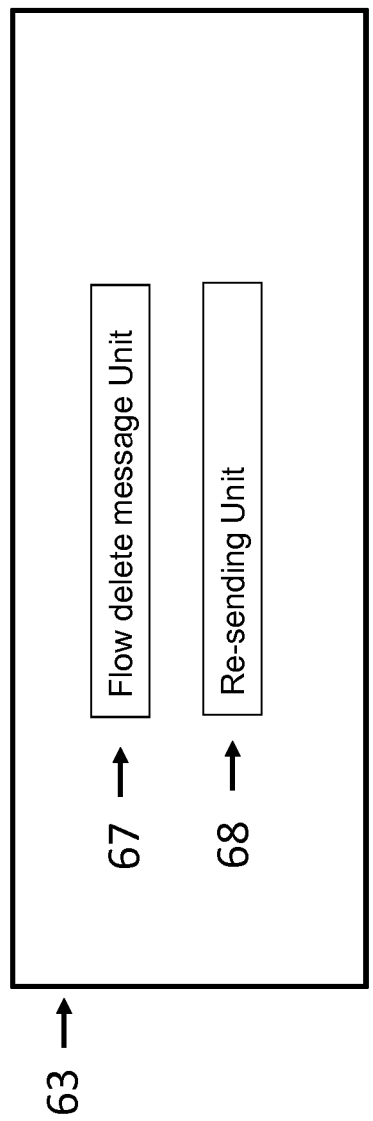
FIG. 17 is a schematic diagram showing a resynchronization unit comprising functional units according to an embodiment.

FIG. 17 is a schematic diagram showing a re-synchronization unit comprising logical units according to another embodiment. The resynchronization unit (63) comprises a flow delete message unit (67) for sending a flow delete message to the switch and a re-sending unit (68) for re-sending to the switch each flow modification message.

Figure 18:
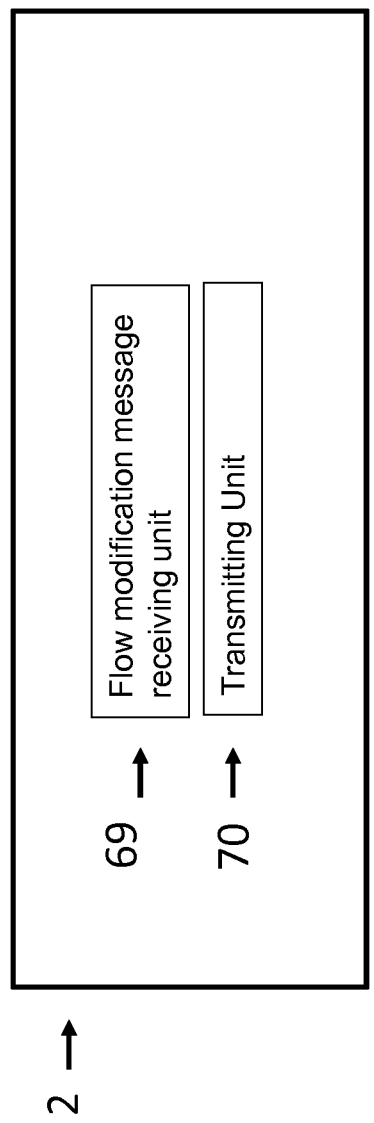
FIG. 18 is a schematic diagram showing a switch comprising functional units according to an embodiment.

FIG. 18 is a schematic diagram showing a switch comprising logical units according to an embodiment. The switch comprises a flow modification message receiving unit (69) for receiving from the controller the flow modification messages comprising an identifier. The switch further comprises a transmitting unit (70) arranged to transmit an identifier of the current state of the flow data in the switch, e.g. the identifier of the last received flow data message.

The above examples provide for a determination by the controller of a reduced number of flow modification messages which need to be communicated with As will be appreciated by the person skilled in the art, the present disclosure may be embodied as a method, apparatus, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product comprising a computer program, the computer program comprising instructions, which, when executed on at least one processor, carry out a method as described herein. The computer program product may be contained in a carrier, wherein the carrier optionally includes an electrical signal, an optical signal, a radio signal, a magnetic tape or disk, an optical disk or a memory stick.

The present disclosure has been described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Although specific embodiments have been illustrated and described herein, those of ordinary skill in the art appreciate that any arrangement which is calculated to achieve the same purpose may be substituted for the specific embodiments shown and that the disclosure has other applications in other environments. This application is intended to cover any adaptations or variations of the present disclosure. The disclosure is not intended to be limited in scope to the specific embodiments described herein, but to be defined by the following claims.

The invention claimed is:

1. A controller configured to control a switch in a communications network, wherein the controller is configured to transmit to the switch a plurality of flow modification messages comprising flow data for routing flows through the switch;
wherein the controller is configured to:
provide an identifier in each flow modification message;
receive a resynchronization message from the switch upon reestablishment of communications between the controller and the switch after a loss of connectivity, wherein the resynchronization message comprises an identifier indication for indicating said identifier of the flow modification message most recently received by the switch;
determine which one or more of the flow modification message(s) have not been received by the switch based on the received identifier indication; and
retransmit the one or more flow modification messages determined not to have been received by the switch,
wherein the controller is further configured to determine if all transmitted flow modification messages have been received by the switch by comparing the identifier indication with an identifier of a most recently transmitted flow modification message.

2. A controller as claimed in claim 1 configured for use in a network wherein network control and forwarding are decoupled through abstraction of forwarding functionalities, and/or the controller is a Software Defined Network, SDN, controller.

3. A controller as claimed in claim 1 configured to transmit to and receive from the switch OpenFlow messages.

4. A controller as claimed in claim 1 configured to retransmit only flow modification messages which have been determined not to have been received by the switch.

5. A controller as claimed in claim 1, further configured to determine whether the resynchronization message comprises said identifier indication, and, if not, to resynchronize a switch state and a controller state by a complete exchange of flow table data between the switch and the controller.

6. A controller as claimed in claim 5, further configured to resynchronize a switch state and a controller state by a complete exchange of flow table data by sending a flow data request to the switch, receiving flow data from the switch, or, further configured to resynchronize a switch state and a controller state by a complete exchange of flow table data by sending a flow delete message to the switch and re-sending to the switch each flow modification message in the history.

7. A switch for use in a communications network, operative to receive from a controller a plurality of flow modification messages comprising flow data for routing flows through the switch, wherein the switch is configured to:
receive from the controller a plurality of flow modification messages comprising an identifier and receive one or more flow modification messages determined not to have been received; and
on reestablishment of communications between the controller and the switch after a loss of connectivity, transmit to the controller a resynchronization message comprising an identifier indication capable of being used to identify an identifier of a most recently received flow modification message.

8. A switch as claimed in claim 7 configured for use in a network wherein network control and forwarding are decoupled through abstraction of forwarding functionalities, and/or the switch is a Software Defined Network, SDN, switch.

9. A switch as claimed in claim 7 configured to transmit to and receive from the controller OpenFlow messages.

10. A method of providing state synchronization between a controller and a switch in a communications network, wherein the controller provides flow data for routing flows through the switch and transmits, in flow modification messages, the flow data to the switch for storage in flow tables, the method comprising the controller:
providing an identifier in each flow modification message; and
upon reestablishment of communications between the controller and the switch after a loss of connectivity, the controller:
receiving a resynchronization message from the switch, wherein the resynchronization message comprises an identifier indication capable of being used to identify an identifier of a most recently received flow modification message;
determining which one or more of the flow modification messages have not been received by the switch based on the received identifier indication, wherein all transmitted flow modification messages have been received by the switch is determined by comparing the identifier indication with an identifier of a most recently transmitted flow modification message;
identifying, flow modification messages transmitted after the most recently received flow modification message as "un-received" messages; and
retransmitting un-received messages.

11. A method as claimed in claim 10, wherein the communications network wherein network control and forwarding are decoupled through abstraction of forwarding functionalities.

12. A method as claimed in claim 10, wherein the controller and switch communicate using Openflow messages.

13. A method as claimed in claim 10, wherein only unreceived messages are retransmitted.

14. A method as claimed in claim 10, further comprising the step of determining at the controller whether the resynchronization message comprises an identifier indication, and, if not, re-synchronizing a switch state and a controller state by a complete exchange of flow table data between the switch and the controller, wherein re-synchronizing the switch state and the controller state comprises either:

the steps of:
sending a flow data request to the switch;
receiving flow data from the switch; and
recording the flow data; or the steps of:
sending a flow delete message to the switch; and
re-sending to the switch each flow modification message.

15. A method as claimed in claim 10 further comprising, at the switch:
receiving from the controller a plurality of flow modification messages comprising an identifier; and
on reestablishment of communications between the controller and the switch after a loss of connectivity:
transmitting to the controller a resynchronization message comprising an identifier indication capable of being used to identify an identifier of a most recently received flow modification message.

16. A method of providing state synchronization between a controller and a switch in a communications network, wherein the controller provides flow data for routing flows through the switch and transmits, in flow modification messages, the flow data to the switch for storage in flow tables, the method comprising the switch:
receiving from the controller a plurality of flow modification messages comprising an identifier; and
on reestablishment of communications between the controller and the switch after a loss of connectivity:
transmitting to the controller a resynchronization message comprising an identifier indication capable of being used to identify an identifier of a most recently received flow modification message; and
receiving one or more flow modification messages determined not to have been received by the switch.

17. A non-transitory computer readable storage medium, comprising instructions which, when executed on at least one processor, cause the at least one processor to:
provide an identifier in each flow modification message;
receive a resynchronization message from the switch upon reestablishment of communications between the controller and the switch after a loss of connectivity, wherein the resynchronization message comprises an identifier indication for indicating said identifier of the flow modification message most recently received by the switch;
determine which one or more of the flow modification message(s) have not been received by the switch based on the received identifier indication; and
retransmit the one or more flow modification messages determined not to have been received by the switch,
wherein the processor is further configured to determine if all transmitted flow modification messages have been received by the switch by comparing the identifier indication with an identifier of a most recently transmitted flow modification message.

18. An apparatus for use in a controller in a communications network wherein the controller provides flow data for routing flows through a switch and transmits, in flow modification messages, the flow data to the switch for storage in flow tables, the apparatus comprising processor circuitry, a memory containing instructions executable by the processor circuitry, a transmitter and a receiver, whereby the apparatus is operative to:
provide an identifier in each flow modification message; and
upon reestablishment of communications between the controller and the switch after a loss of connectivity:
receive a resynchronization message from the switch, wherein the resynchronization message comprises an identifier indication capable of being used to identify an identifier of a most recently received flow modification message;
determine which one or more of the flow modification messages have not been received by the switch based on the received identifier indication, wherein all transmitted flow modification messages have been received by the switch is determined by comparing the identifier indication with an identifier of a most recently transmitted flow modification message;
identify flow modification messages transmitted after the most recently received flow modification message as "un-received" messages; and
retransmit un-received messages.

19. An apparatus for use in a switch in a communications network, wherein a controller provides flow data for routing flows through the switch and transmits, in flow modification messages, the flow data to the switch for storage in flow tables, the apparatus comprising processor circuitry, a memory containing instructions executable by the processor circuitry, a transmitter and a receiver, whereby the apparatus is operative to:
receive from the controller a plurality of flow modification messages comprising an identifier; and
on reestablishment of communications between the controller and the switch after a loss of connectivity:
transmit to the controller a resynchronization message comprising an identifier indication capable of being used to identify an identifier of a most recently received flow modification message; and
receive one or more flow modification messages determined not to have been received by the switch.

* * * * *